US010086628B1

(12) United States Patent
DiDomenico

(10) Patent No.: US 10,086,628 B1
(45) Date of Patent: Oct. 2, 2018

(54) PROTECTIVE LOUVERS IN A DRYER MODULE FOR A PRINTING APPARATUS

(71) Applicant: XEROX CORPORATION, Norwalk, CT (US)

(72) Inventor: Gilles DiDomenico, Marseilles (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/587,443

(22) Filed: May 5, 2017

(51) Int. Cl.

| | |
|---|---|
| ***B41J 11/00*** | (2006.01) |
| *G01J 1/04* | (2006.01) |
| *F21V 17/02* | (2006.01) |
| *G02B 27/00* | (2006.01) |
| *G01J 1/00* | (2006.01) |
| *F26B 3/28* | (2006.01) |

(52) U.S. Cl.
CPC ............... *B41J 11/002* (2013.01); *F26B 3/28* (2013.01)

(58) Field of Classification Search
CPC ........ B41F 23/0443; F26B 3/28; G02B 5/208; B41J 11/002
See application file for complete search history.

(56) References Cited

U.S. PATENT DOCUMENTS 4,057,346 A * 11/1977 Ellingham ......... G03B 27/6285 355/41
5,317,127 A 5/1994 Brewster, Jr. et al.
5,822,900 A * 10/1998 Armstrong ............ G09F 11/025 40/473
5,966,836 A 10/1999 Valdez, III et al.
6,340,225 B1 1/2002 Szlucha
6,439,712 B1 8/2002 Mizutani et al.
6,543,890 B1 * 4/2003 Ylitalo ................... B41J 11/002 347/102
6,550,905 B1 * 4/2003 Deckers .............. C09D 11/101 347/100
6,621,087 B1 * 9/2003 Bisges .................... F21V 7/005 250/492.1
6,883,936 B2 * 4/2005 Register ............. H01R 33/0854 250/504 R
7,128,429 B2 * 10/2006 Tausch ...................... F26B 3/28 359/614
7,638,780 B2 * 12/2009 Kilburn ..................... F26B 3/28 118/620
8,729,498 B2 * 5/2014 Fleischhacker ........ B05D 3/067 250/455.11
2006/0290760 A1 * 12/2006 German ................. B41J 11/002 347/102

* cited by examiner

*Primary Examiner* — John P Zimmermann
(74) *Attorney, Agent, or Firm* — Maginot Moore & Beck LLP

(57) ABSTRACT

A printing apparatus, such as a large-scale ink jet printer, includes a drying module having a set of lamps disposed near a sheet path. A set of louvers can be positioned so that a portion of each louver can be interposed between the lamps and a sheet path. In one embodiment, the lamps are held by a set of lamp mounts, and each louver is pivotable around one lamp mount. In one embodiment, the louvers cover the lamps in response to a detected condition within the printer, such as a sheet jam or high temperature.

14 Claims, 5 Drawing Sheets

PROTECTIVE LOUVERS IN A DRYER MODULE FOR A PRINTING APPARATUS

TECHNICAL FIELD

The present disclosure relates to a dryer suitable for use in a large-scale, high-volume printing apparatus.

BACKGROUND

In many types of printing, particularly ink-jet printing, there is a need to dry or cure ink placed on a sheet quickly. In a large-scale, high volume ink-jet printing application, particularly where full-color images are placed on a fast-moving continuous web, fusing, drying, curing or other treatment of the web is typically performed by an elaborate fusing, drying, or curing system. (As used herein, all such systems will be generally referred to as "drying.") These systems very often will apply high temperatures or radiation, such as infrared, to the sheet or web.

With large-scale, high-speed printing apparatus, such as for printing on a web, there may be a need to provide a safety system around the source of the high temperature or other radiation. If, for instance, there is a jam or other anomalous condition in the apparatus, the sheet may accordion within the dryer system, coming into contact with a hot heating or radiation element. It is therefore desirable to enable a covering of the heating or radiation elements under certain conditions. Conversely, there may be reasons for controllably uncovering a heating or radiation element relative to the sheet, such as to control convection heat or other airflow within the apparatus.

SUMMARY

According to one aspect, there is provided a dryer for use in printing. At least two lamp mounts are disposed along a sheet path, each lamp mount for holding at least one lamp. At least two louvers are provided, each louver being pivotably movable about an axis. A mechanism positions the louvers in a selected position, one position being a closed position wherein a portion of each louver is interposed between a lamp and the sheet path.

According to another aspect, there is provided a printing apparatus including means for placing marks on a sheet moving through a sheet path. At least two lamp mounts are disposed along the sheet path, each lamp mount for holding at least one lamp. At least two louvers are provided, each louver being pivotably movable about an axis. A mechanism positions the louvers in a selected position, one position being a closed position wherein a portion of each louver is interposed between a lamp and the sheet path.

DETAILED DESCRIPTION

Figure 1:
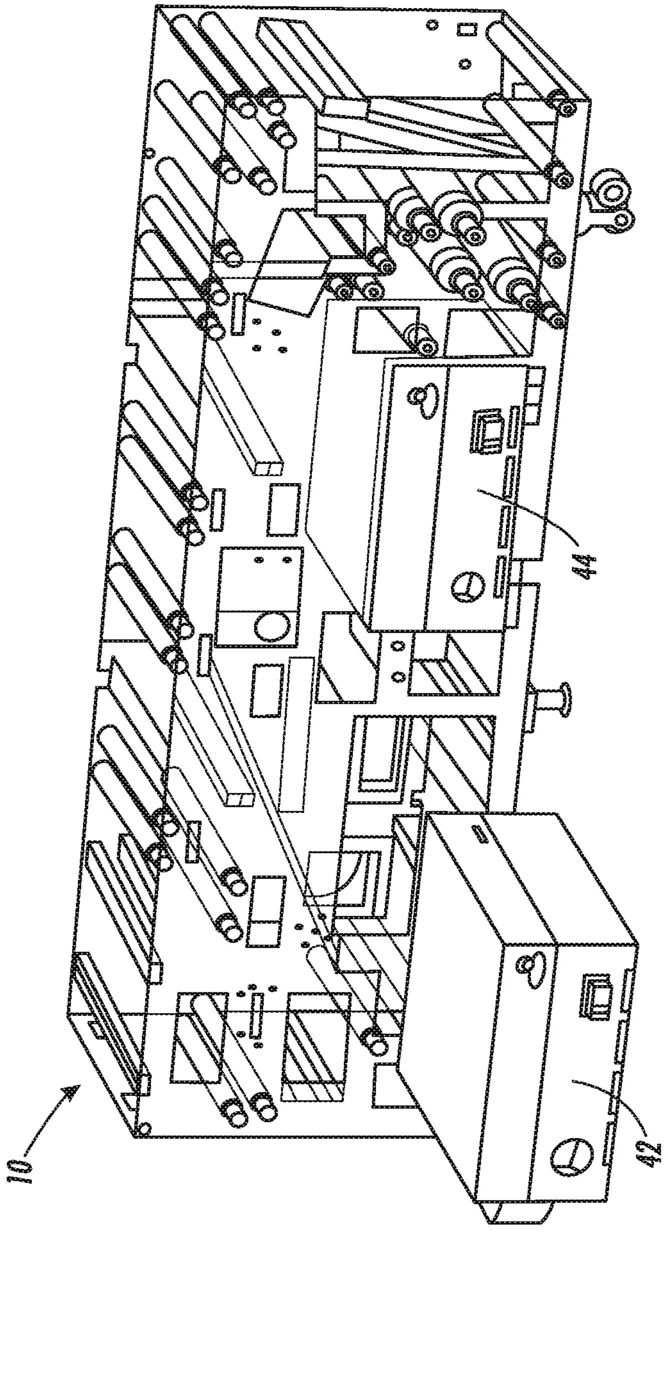
FIG. 1 (Prior Art)
FIG. 1 is a perspective view of the frame of a high-volume printing apparatus, as known in the Prior Art.

FIG. 1 is a perspective view of the frame of a high-volume printing apparatus generally indicated as 10. In the particular architecture shown, a continuous web, such as of paper, is moved along the rollers through a sheet path at the top of the frame, where it is printed upon by a set of printheads (not shown). The web, having ink freshly placed thereon, can then be directed through one or more dryer modules, indicated as 42 and 44. In the Figure, dryer module 42 is shown removed from apparatus 10, while module 44 is shown in place to permit a sheet or web to pass through. In other types of printing apparatus, other means of placing marks on a sheet, such as by xerography, lithography, or use of photosensitive media, will be apparent.

Figure 2:
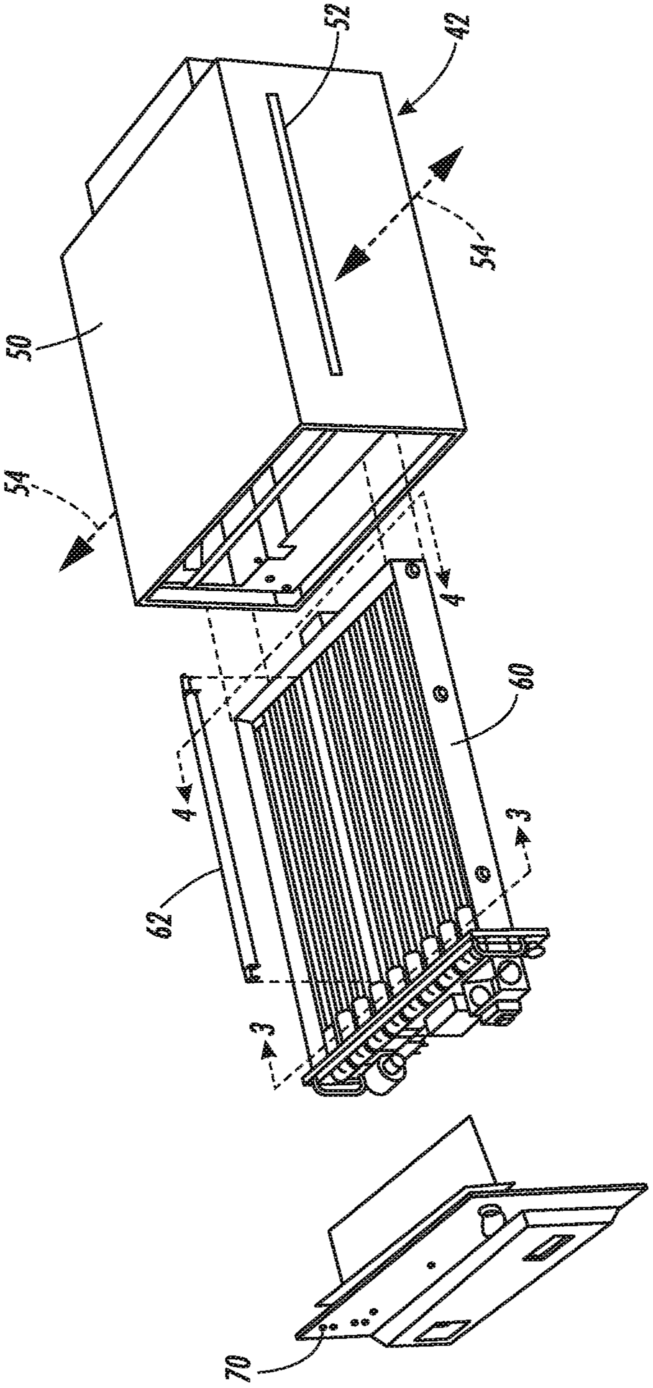
FIG. 2 is a perspective, partially exploded view of a single dryer module in isolation.

FIG. 2 is a perspective, partially exploded view of a single dryer module such as 42 in isolation. Dryer module 42 comprises a generally rectangular cabinet 50, defining a loosely enclosed chamber. The side walls of chamber 50 define sheet slots such as 52 (with another slot, not visible in the Figure) through which paper or other substrate, such as but not necessarily in the form of a continuous web, can pass through the chamber in a sheet path 54 in a process direction, in either direction (left or right, as shown) depending on the larger architecture and operation of printing apparatus 10. Further structures, not shown, may be provided within cabinet 50 to prevent direct contact of the sheet or web with any of the lamps 62. In the illustrated embodiment, the slots 52 and any associated structure (not shown) can be said to form a "sheet path."

Also shown in FIG. 2 is a lamp-mounting base 60, which holds and conveys electrical power (through circuitry, not shown) to any number of lamps 62, one of which is shown in isolation in the exploded view. The lamps 62 can be of any type known in the art of drying, fixing, or curing ink or other marking material on printed sheets, and could also include or consist of simple resistive elements. As shown in the embodiment, the lamps 62 extend transversely relative to the process direction through which sheets or a web pass. In an alternate embodiment, lamps 62 can be mounted along the process direction and therefore be selectably turned on according to the paper width passing through the dryer module.

In one practical embodiment, the base 60 is slidably disposed in chamber 50, where connections are made (such as with plugs or other contacts, not shown) with the power supply of the printing apparatus 10. As shown, the base 60 may be at least partially removed from the chamber of cabinet 50 for access to at least one lamp 62. As used herein, the term "slidably" need not require specialized hardware or structures, such as rollers, handles, etc. A cover plate 70 is used to further enclose the cabinet 50, and may also include or interact with safety features such as a switch which prevents, for example, energizing of the lamps 62 if the cover plate 70 is not installed correctly. In an embodiment, the cover plate 70 could be removed or otherwise opened for access to base 60 even if the module 42 is still disposed within the frame of printing apparatus 10.

Figure 3A:
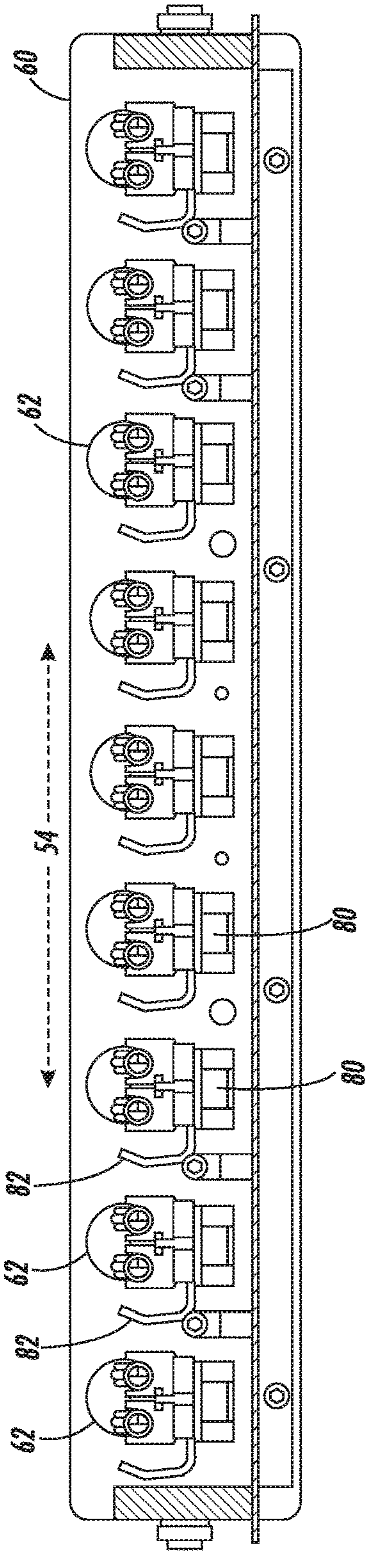
FIG. 3A and FIG. 3B are cross-sectional views though line 3-3 in FIG. 2, showing a set of louvers in an open and closed position, respectively.
Figure 3B:
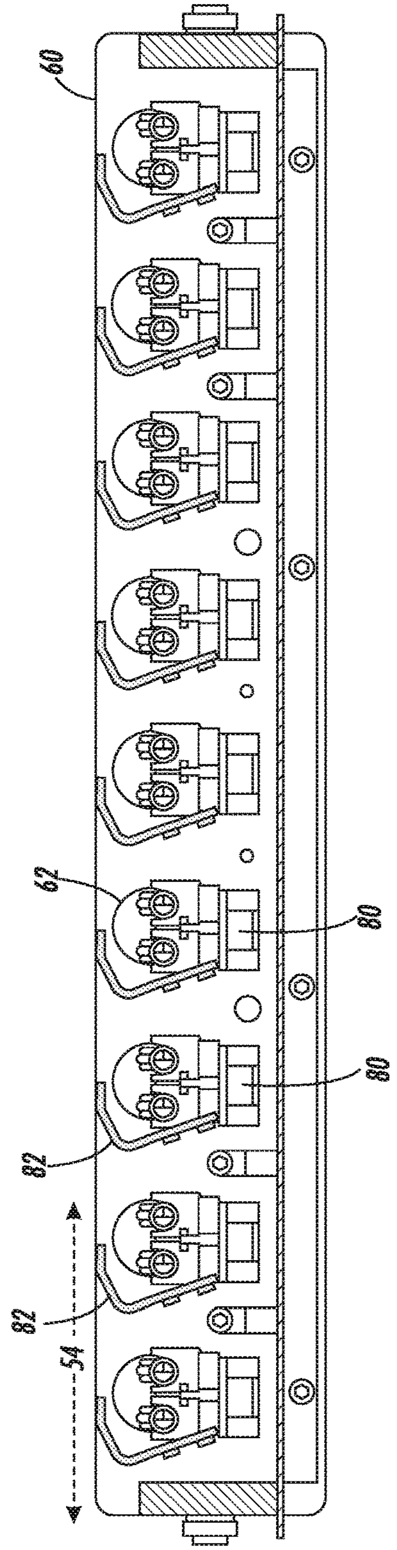

FIG. 3A and FIG. 3B are cross-sectional views of base 60 in isolation though line 3-3 in FIG. 2. In each Figure, a sheet or web with freshly-placed ink thereon passes through sheet path 54 with the inked side facing downward, above and facing toward lamps 62. Each cylindrical lamp 62, which is shown as a semicircle in the sectional view, is mounted in a lamp mount 80. As is typical in the design of electrical fixtures, the lamp mounts 80 in the present embodiment can both support and convey electrical power to the lamps 62.

Further as shown in FIGS. 3A and 3B, there is, in the present embodiment, associated with each lamp mount 80 a pivotably-mounted louver 82 (which can also be called a "shutter" or a "vane"). As can be seen by a comparison of FIGS. 3A and 3B, in FIG. 3A the louvers 82 are positioned in what can be called an "open" position; in FIG. 3B the louvers 82 are pivoted or positioned upward into a "closed" or "covered" position, where a portion of each louver 82 is interposed between its associated lamp mount 80 and the sheet path 54.

In a typical practical embodiment, each lamp 62 will directly supply radiant energy (heat and/or light) to about 1 cm to about 5 cm of length of a sheet moving therepast along path 54. In a typical practical embodiment, there are provided at least six lamp mounts 80 with associated louvers 82 along a process direction of the sheet path 54. In an upward, "closed" position as in FIG. 3B, a louver 82 will effectively cover the lamp 62 relative to the sheet or web in path 54. There may be numerous and overlapping reasons why a lamp 62, or many or all lamps 62 in a dryer, would be covered in the course of operation of a dryer or printer. One possible reason is to prevent direct contact of a sheet with a lamp 62, such as in a jam, stoppage, or other abnormal situation. Another possible reason is to allow fine control of the temperature of the sheet, especially if the heat output of lamps 62 is not finely controllable. Similarly, covering lamps 62 to some extent may be a way of controlling an airflow (convection heat, or any other kind of airflow) moving from lamps 62 to the sheet, if that is desired in a particular situation.

In a possible alternate embodiment, the louvers 82 can be dimensioned so that, in the "closed" position, the louvers 82 overlap each other so that the lamps 62 are completely covered relative to sheet path 54. Depending on the specific desired function of the louvers, the louvers 82 can be made of various materials, such as a relatively heat-insulative material such as plastic, or a heat-conductive material such as metal. The louvers 82 could be transparent, opaque, and/or IR-transmissive as needed for a desired outcome.

Figure 4:
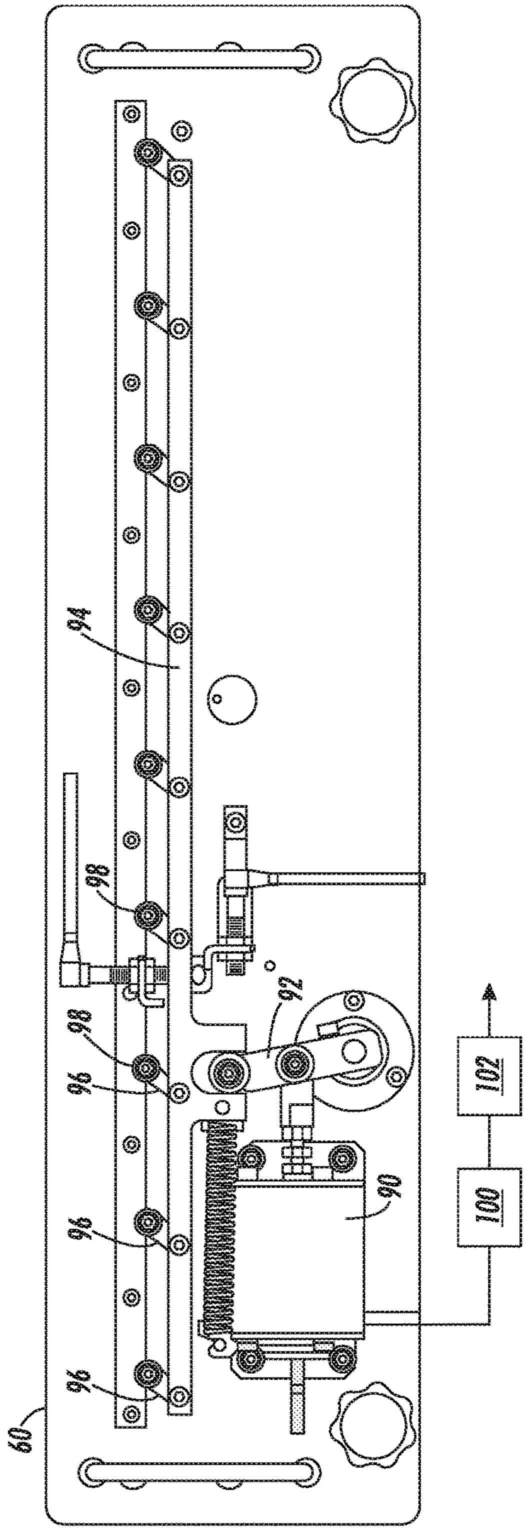
FIG. 4 is a view from line 4-4 in FIG. 2, showing a side of a lamp-mounting base in isolation.

FIG. 4 is a view from line 4-4 in FIG. 2, showing the "rear" side of the base 60 in isolation. In the present embodiment, there can be seen in this view what can generally be called a "mechanism" for positioning the louvers 82 in a selected position. The illustrated mechanism includes an electrically-operated actuator such as a plunger 90, which in turn is associated with a lever 92, rack 94, and linkages 96. Comparing FIG. 4 to FIGS. 3A and 3B, it can be seen that each linkage 96 corresponds to axle 98 forming a pivoting axis of one louver 82. As can be seen, operation of plunger 90 will in turn move lever 92 and rack 94 to cause each linkage 96 to position and pivot its corresponding louver 82 to a desired position, closed or open, with all of the louvers 82 opening or closing together. Other mechanisms having a similar effect will be apparent to one of skill in the art. It will be noticed that, in the illustrated embodiment, the axle 98 associated with each lamp mount 80 is disposed on the opposite side of each lamp 62 relative to sheet path 54.

In the illustrated embodiment, an electrically-operated actuator such as plunger 90 responds to input signals from a control system such as 100, which may be associated with the dryer module 42 itself, or with a larger control system associated with the printer 10 as a whole. In one embodiment, the control system 100 may respond to a sheet motion sensor 102, which may be located with module 42 or anywhere in the printer 10, and be sensitive to, for example, a sheet or web jam or stop anywhere in the printer. In one embodiment, a sheet stop detected by sensor 102 would cause control system 100 to send an electrical signal to plunger 90, in turn causing the louvers 82 to cover the lamps 62, such as to prevent contact of the sheet with the lamps 62. Other reasons for the positioning of the louvers 82, either open or closed, by control system 100 for a given detected condition may include the detection of high temperature, smoke or other gas, or anomalous power consumption.

Similarly, another type of detected condition could cause the control system 100 to send an electrical input signal to plunger 90 to cause the louvers 82 to open or uncover the lamps 62, in effect allowing direct radiation and/or airflow between the lamps 62 and the sheet. Such conditions for opening the louvers 82 could include: a power-up, a reset after a detected condition for covering the lamps 62, detection of renewed motion of the sheet after a sheet stop has been detected, a need (however detected) for increasing an airflow through the dryer, or a need (however detected) for increasing heat applied to the sheet or web. Of course, the various possible conditions for desiring either opening or closing the louvers 82 will depend on the overall architecture and control systems associated with a dryer such as 42 or a printer 10.

As used herein, a "dryer" or "dryer module" shall be defined as any hardware that provides energy, such as radiant heat, convective heat, ultraviolet light, etc., to a sheet or to an image or partial image placed on a sheet at any point in an overall printing process. Also, the action of a dryer or dryer module ("drying") shall also include curing of ink, toner, or other marking material, or causing any other chemical reaction in ink, toner, or other marking material. When it is stated that a sheet is caused to move "through" a dryer or drying module, it is meant the sheet is placed relative to the dryer or drying module in such a way that the dryer or drying module influences (such as by heating, drying, or curing) the ink, toner, or other marking material and/or the sheet itself. Such influencing can occur before or after any image or partial image is placed on the sheet, i.e., includes pre-heating or pre-treating. As used herein, the term "sheet" shall include any type of substrate on which an image is desired to be printed, regardless of the material thereof (e.g., paper, plastic, etc.), and shall include discrete sheets or a continuous web.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A dryer for use in printing comprising:

a plurality of lamp mounts disposed along a sheet path, each lamp mount being configured to hold a lamp at an orientation that enables a longitudinal axis of the lamp held in the lamp mount to be parallel to one of a cross-process direction and process direction through the dryer and perpendicular to the other of the cross-process direction and process direction;

a plurality of louvers, each louver being associated with only one lamp mount in a one-to-one correspondence between the plurality of lamp mounts and the plurality of louvers, each louver being pivotably movable about an axis that is parallel to the longitudinal axis of the lamp held by the lamp mount associated with the louver; and a mechanism for pivoting the louvers between a first position and a second position, the first position being a closed position at which a portion of each louver is interposed between a lamp held by the lamp mount associated with the louver and the sheet path and the second position being an opened position at which radiation from the lamp held by the lamp mount associated with the louver impinges on the sheet path.

2. The dryer of claim 1, each lamp directly supplying radiant energy to about 1 cm to about 5 cm of length of a sheet in the sheet path that is perpendicular to the longitudinal axis of the lamp.

3. The dryer of claim 1 further comprising:

a frame in which the lamp mounts are positioned, the frame being configured to move between a first position and a second position, the first position being within the dryer to position the lamps in the lamp mounts over the sheet path and the second position being outside of the dryer to expose the lamps within the lamp mounts.

4. The dryer of claim 1, the mechanism further comprising:

a rack connected by a plurality of pivoting links to each of the louvers in a one-to-one correspondence between the louvers and the pivoting links;

a reciprocating actuator; and a lever, the lever having a first portion connected to the rack and a second portion that engages the reciprocating actuator to enable the reciprocating actuator to move the lever from a first position to a second position that moves the rack and the pivoting links to position the louvers at the closed position and to return the lever to the first position from the second position to move the rack and the pivoting links to position the louvers at the opened position.

5. The dryer of claim 4 further comprising:

a control system operatively connected to the reciprocating actuator, the control system being configured to operate the reciprocating actuator to move the lever between the first position and the second position to place the louvers in one of a closed position or an open position.

6. The dryer of claim 5 further comprising:

a sensor configured to generate a signal indicative of sheet motion; and the control system being further configured to receive the signal generated by the sensor and operate the reciprocating actuator with reference to the generated signal indicating a sheet being stopped in the sheet path.

7. The dryer of claim 1 wherein the louvers are configured to overlap with an adjacent lever in the plurality of louvers when the louvers are in the closed position.

8. A printing apparatus, comprising:

means for placing marks on a sheet moving through a sheet path;

a mechanism for positioning the louvers in a selected position, one position being a closed position wherein a portion of each louver is interposed between a lamp and the sheet path;

a plurality of lamp mounts disposed along a sheet path, each lamp mount being configured to hold a lamp at an orientation that enables a longitudinal axis of the lamp held in the lamp mount to be parallel to one of a cross-process direction and process direction through the dryer and perpendicular to the other of the cross-process direction and process direction;

a plurality of louvers, each louver being associated with only one lamp mount in a one-to-one correspondence between the plurality of lamp mounts and the plurality of louvers, each louver being pivotably movable about an axis that is parallel to the longitudinal axis of the lamp held by the lamp mount associated with the louver; and a mechanism for pivoting the louvers between a first position and a second position, the first position being a closed position at which a portion of each louver is interposed between a lamp held by the lamp mount associated with the louver and the sheet path and the second position being an opened position at which radiation from the lamp held by the lamp mount associated with the louver impinges on the sheet path.

9. The printing apparatus of claim 8, each lamp directly supplying radiant energy to about 1 cm to about 5 cm of length of a sheet in the sheet path that is perpendicular to the longitudinal axis of the lamp.

10. The printing apparatus of claim 8 further comprising:

a frame in which the lamp mounts are positioned, the frame being configured to move between a first position and a second position, the first position being within the dryer to position the lamps in the lamp mounts over the sheet path and the second position being outside of the dryer to expose the lamps within the lamp mounts.

11. The printing apparatus of claim 8, the mechanism further comprising:

a rack connected by a plurality of pivoting links to each of the louvers in a one-to-one correspondence between the louvers and the pivoting links;

a reciprocating actuator; and a lever, the lever having a first portion connected to the rack and a second portion that engages the reciprocating actuator to enable the reciprocating actuator to move the lever from a first position to a second position that moves the rack and the pivoting links to position the louvers at the closed position and to return the lever to the first position from the second position to move the rack and the pivoting links to position the louvers at the opened position.

12. The printing apparatus of claim 11, further comprising a control system operatively connected to the reciprocating actuator, the control system being configured to operate the reciprocating actuator to move the lever between the first position and the second position to place the louvers in one of a closed position or an open position.

13. The printing apparatus of claim 12 further comprising:

a sensor configured to generate a signal indicative of sheet motion; and the control system being further configured to receive the signal generated by the sensor and operate the reciprocating actuator with reference to the generated signal indicating a sheet being stopped in the sheet path.

14. The printing apparatus of claim 8 wherein the louvers are configured to overlap with an adjacent louver in the plurality of louvers when the louvers are in the closed position.

* * * * *